(12) United States Patent
Ito et al.

(10) Patent No.: US 10,476,117 B2
(45) Date of Patent: Nov. 12, 2019

(54) VEHICLE POWER SUPPLY SYSTEM

(71) Applicant: HONDA MOTOR CO., LTD., Tokyo (JP)

(72) Inventors: Satoko Ito, Wako (JP); Daijiro Takizawa, Wako (JP); Toru Ogaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 135 days.

(21) Appl. No.: 15/532,324

(22) PCT Filed: Oct. 27, 2015

(86) PCT No.: PCT/JP2015/080267
§ 371 (c)(1),
(2) Date: Jun. 1, 2017

(87) PCT Pub. No.: WO2016/088476
PCT Pub. Date: Jun. 9, 2016

(65) Prior Publication Data
US 2017/0271727 A1    Sep. 21, 2017

(30) Foreign Application Priority Data
Dec. 4, 2014    (JP) .................................. 2014-245941

(51) Int. Cl.
*H01M 10/6568*    (2014.01)
*B60L 11/18*    (2006.01)
(Continued)

(52) U.S. Cl.
CPC .......... *H01M 10/6568* (2015.04); *B60K 1/04* (2013.01); *B60K 11/02* (2013.01); *B60L 50/50* (2019.02);
(Continued)

(58) Field of Classification Search
CPC .......... B60K 11/02; B60K 11/04; B60K 1/04; B60K 2001/005; B60K 2001/0422;
(Continued)

(56) References Cited

U.S. PATENT DOCUMENTS 5,624,003 A * 4/1997 Matsuki ............. B60H 1/00278
180/65.1
2001/0040061 A1    11/2001    Matuda et al.
(Continued)

FOREIGN PATENT DOCUMENTS

CN    101641823 A    2/2010
CN    103943913 A    7/2014
(Continued)

OTHER PUBLICATIONS

Japanese Office Action application No. 2016-562350 dated Nov. 14, 2017.
(Continued)

*Primary Examiner* — Lingwen R Zeng
(74) *Attorney, Agent, or Firm* — Squire Patton Boggs (US) LLP

(57) ABSTRACT

A vehicle power supply system includes: a plurality of battery modules each having a plurality of high-voltage batteries; a case for accommodating the plurality of battery modules; and a cooling circuit having a radiator, a cooling pump, a plurality of battery cooling units for cooling the plurality of battery modules, the case being disposed below a floor panel. In the cooling circuit, the plurality of battery module cooling units are disposed in parallel; and a branch portion which is provided to an upstream side of the plurality of battery module cooling units and a merging portion which is provided to a downstream side of the plurality of battery module cooling units are provided inside the case.

4 Claims, 7 Drawing Sheets

(51) Int. Cl.
| | |
|---|---|
| *H02J 7/00* | (2006.01) |
| *H01M 10/613* | (2014.01) |
| *H01M 10/625* | (2014.01) |
| *B60K 1/04* | (2019.01) |
| *H01M 2/10* | (2006.01) |
| *B60K 11/02* | (2006.01) |
| *H01M 10/667* | (2014.01) |
| *B60L 50/50* | (2019.01) |
| *B60L 50/60* | (2019.01) |
| *B60K 1/00* | (2006.01) |
| *B60K 11/04* | (2006.01) |

(52) U.S. Cl.
CPC ........... *B60L 50/66* (2019.02); *H01M 2/1077* (2013.01); *H01M 10/613* (2015.04); *H01M 10/625* (2015.04); *H01M 10/667* (2015.04); *H02J 7/0052* (2013.01); *B60K 11/04* (2013.01); *B60K 2001/005* (2013.01); *B60K 2001/0422* (2013.01); *B60K 2001/0433* (2013.01); *B60K 2001/0438* (2013.01); *H01M 2/1083* (2013.01); *H01M 2220/20* (2013.01); *H02J 2007/0059* (2013.01)

(58) Field of Classification Search
CPC .... B60K 2001/0433; B60K 2001/0438; B60L 11/18; B60L 11/1877; B60L 50/50; B60L 50/66; H01M 10/613; H01M 10/625; H01M 10/6568; H01M 10/667; H01M 2220/20; H01M 2/1077; H01M 2/1083; H02J 2007/0059; H02J 7/0052
See application file for complete search history.

(56) References Cited

U.S. PATENT DOCUMENTS

| | | | |
|---|---|---|---|
| 2008/0295535 | A1 | 12/2008 | Robinet et al. |
| 2010/0099015 | A1 | 4/2010 | Kawai |
| 2013/0030622 | A1 | 1/2013 | Park et al. |
| 2014/0038009 | A1* | 2/2014 | Okawa ................ H01M 10/486 429/62 |
| 2014/0076979 | A1* | 3/2014 | Weng ..................... B60L 1/003 236/74 R |

FOREIGN PATENT DOCUMENTS

| | | |
|---|---|---|
| EP | 2 637 248 A1 | 9/2013 |
| JP | 2001037009 A | 2/2001 |
| JP | 2005-012890 A | 1/2005 |
| JP | 2005251459 A | 9/2005 |
| JP | 2008-105645 A | 5/2008 |
| JP | 2009-006744 A | 1/2009 |
| JP | 2009-126256 A | 6/2009 |
| JP | 2013028323 A | 2/2013 |
| JP | 2013136266 A | 7/2013 |
| JP | 2013-173389 A | 9/2013 |
| JP | 2013-187159 A | 9/2013 |
| JP | 2014216248 A | 11/2014 |
| WO | WO 2013/084940 A1 | 6/2013 |

OTHER PUBLICATIONS

Chinese Office Action application No. 201580065290.0 dated Oct. 22, 2018.
International Search Report dated Jan. 19, 2016 corresponding to International Patent Application No. PCT/JP2015/080267, and English translation thereof.
Japanese Office Action application No. 2016-562350 dated Mar. 13, 2018.

* cited by examiner

VEHICLE POWER SUPPLY SYSTEM

TECHNICAL FIELD

The present invention relates to a vehicle power supply system which is provided on an electric vehicle or the like.

BACKGROUND ART

There is known a vehicle power supply system which includes a high-voltage battery and high-voltage system equipment and in which the high-voltage battery and the high-voltage system equipment are cooled by a single cooling circuit (for example, refer to Patent Literature 1). Additionally, there is known a vehicle power supply system which includes a plurality of battery modules each having a plurality of high-voltage batteries and in which these battery modules are cooled by a single cooling circuit (for example, refer to Patent Literature 2).

PRIOR ART LITERATURE

Patent Literature

Patent Literature 1: JP-A-2005-12890
Patent Literature 2: JP-A-2013-173389

SUMMARY OF THE INVENTION

Problem that the Invention is to Solve

In the vehicle power supply system described in Patent Literature 2, since the plurality of battery modules are accommodated individually in separate cases and battery module cooling units (cooling jackets) which are provided individually in the cases are connected together in parallel by way of pipings outside the cases, a piping process of connecting the battery module cooling units together in the way described above is needed to be carried out after the cases have been attached to a vehicle, leading to fears that the fabrication process of the vehicle becomes complex.

The invention provides a vehicle power supply system which can simplify its fabrication process although having a plurality of battery module cooling units which are disposed in parallel.

Means for Solving the Problem

The invention provides the following aspects.

According to a first aspect, there is provided a vehicle power supply system (e.g., a vehicle power supply system 1 in embodiment) including:

a plurality of battery modules (e.g., battery modules 31 to 33 in embodiment) each having a plurality of high-voltage batteries (e.g., high-voltage batteries 31a to 33a in embodiment);

a case (e.g., a case 50 in embodiment) for accommodating the plurality of battery modules; and a cooling circuit (e.g., a cooling circuit 100 in embodiment) having a radiator (e.g., a radiator 101 in embodiment), a cooling pump (e.g., a cooling pump 102 in embodiment), a plurality of battery cooling units (e.g., battery module cooling units 131 to 133 in embodiment) for cooling the plurality of battery modules, the case being disposed below a floor panel (e.g., a floor panel 3 in embodiment), wherein:

in the cooling circuit, the plurality of battery module cooling units are disposed in parallel; and a branch portion (e.g., a branch portion 108 in embodiment) which is provided to an upstream side of the plurality of battery module cooling units and a merging portion (e.g., a merging portion 109 in embodiment) which is provided to a downstream side of the plurality of battery module cooling units are provided inside the case.

According to a second aspect, in the vehicle power supply system according to the first aspect, the plurality of battery modules have different battery capacities, and the cooling circuit has a flow rate control device (e.g., orifices 110, 111 in embodiment) which is disposed at an upstream side or a downstream side of the battery module cooling circuit for cooling the battery module having a small battery capacity among the plurality of battery modules and at a downstream side of the branch portion.

According to a third aspect, in the vehicle power supply system according to the first or second aspect, the plurality of battery modules are disposed under any of seats (e.g., front seats 4, a rear seat 5 in embodiment).

According to a fourth aspect, in the vehicle power supply system according to the third aspect, the plurality of battery modules include at least two rear battery modules (e.g., rear battery modules 32, 33 in embodiment) which are disposed under a rear seat (e.g., the rear seat 5 in embodiment), and the at least two rear battery modules are disposed vertically under a front of a seat cushion of the rear seat.

According to a fifth aspect, in the vehicle power supply system according to the fourth aspect, the plurality of battery modules include a front battery module (e.g., a front battery module 31 in embodiment) which is disposed under a front seat (e.g., the front seats 4 in embodiment), and the front battery module is laid out flat under the front seat.

According to a sixth aspect, in the vehicle power supply system according to the fifth aspect, the front battery module has a battery capacity which is smaller than a total of battery capacities of the at least two rear battery modules, and the cooling circuit has a flow rate control device (e.g., the orifice 110 in embodiment) to an upstream side or a downstream side of a front battery module cooling unit for cooling the front battery module.

According to a seventh aspect, in the vehicle power supply system according to anyone of the first to sixth aspects, the vehicle power supply system includes further high-voltage system equipment having a DC-DC converter (e.g., a DC-DC converter 22 in embodiment) and a charger (e.g., a charger 21 in embodiment), the cooling circuit has further a DC-DC converter cooling unit (e.g., a DC-DC converter cooling unit 122 in embodiment) for cooling the DC-DC converter, and a charger cooling unit (e.g., a charger cooling unit 121 in embodiment) for cooling the charger, and in the cooling circuit, the DC-DC converter cooling unit and the charger cooling unit are disposed in parallel at the downstream side of the plurality of battery module cooling units.

According to an eighth aspect, in the vehicle power supply system according to the seventh aspect, the cooling circuit has:

a bypass flow path (e.g., a bypass flow path 105 in embodiment) which connects the upstream side of the plurality of battery module cooling units to a portion that is positioned on an upstream side of the DC-DC converter cooling unit and the charger cooling unit and that is positioned on the downstream side of the plurality of battery module cooling units; and a flow path selector (e.g., a three-way solenoid valve 106 in embodiment) which is provided at the upstream side of the plurality of battery module cooling units.

According to a ninth aspect, in the vehicle power supply system according to the eighth aspect, the flow path selector is a three-way solenoid valve (e.g., the three-way solenoid valve 106 in embodiment) which is provided at a branch portion (e.g., a branch portion 114 in embodiment) where the bypass flow path branches off from a flow path (e.g., a sixth external piping 103*f* in embodiment) of the upstream side of the plurality of battery module cooling units.

Advantages of the Invention

According to the first aspect, in disposing the plurality of battery module cooling units in parallel, since the branch portion provided to the upstream side of the plurality of battery module cooling units and the merging portion provided to the downstream side of the plurality of battery module cooling units are provided inside the case, the pipings which connect the plurality of battery module cooling units together can be accommodated inside the case, as a result of which a piping process becomes unnecessary in which the battery module cooling units are connected together after the case has been attached to the vehicle, thereby making it possible to simplify the fabrication process of the vehicle.

According to the second aspect, even when cooling the plurality of battery modules having the different battery capacities, the flow rates of refrigerant which match the battery capacities of the plurality of battery modules can be supplied to the corresponding battery module cooling units to thereby cool the plurality of battery modules uniformly.

According to the third aspect, since the plurality of battery modules are disposed under any of the seats, so many battery modules can be mounted on the vehicle by making use of the spaces defined under the seats while suppressing the influence on the space that should be secured for occupants in the vehicle.

According to the fourth aspect, at least the two rear battery modules can be mounted vertically in two stages by making use of the space defined under the rear seat whose seat cushion is inclined obliquely downwards from the front to the rear while suppressing the influence on occupants who are seated on the rear seat.

According to the fifth aspect, the front battery module can be mounted by making use of the space defined under the front seat while suppressing the influence on an occupant who is seated on the front seat.

According to the sixth aspect, even when cooling the front battery module and the rear battery modules which have the different battery capacities, the flow rates of refrigerant which match the battery capacities of the front and rear battery modules can be supplied to the corresponding battery module cooling units to thereby cool the front and rear battery modules uniformly.

According to the seventh aspect, since the DC-DC converter cooling unit and the charger cooling unit, which constitute the high-voltage system equipment cooling unit, are disposed at the downstream side of the plurality of battery module cooling units, the plurality of battery modules, the DC-DC converter and the charger can be cooled by the single cooling circuit. In addition, since the DC-DC converter cooling unit and the charger cooling unit are disposed in parallel, the pressure loss can be reduced when compared with a case where the DC-DC converter cooling unit and the charger cooling unit are disposed in series. Additionally, even though the refrigerant flow rate requirements of the DC-DC converter cooling unit and the charger cooling unit are different, the refrigerant matching the respective refrigerant flow rate requirements can be supplied to the DC-DC converter cooling unit and the charger cooling unit without any waste, and therefore, the delivery capacity of the cooling pump can be suppressed.

According to the eighth aspect, since the cooling circuit has the bypass flow path which bypasses the plurality of battery module cooling units and the flow path selector which determines on the selection of the bypass flow path, the supply of refrigerant to the plurality of battery module cooling units can selectively be cut off by the simple circuit configuration.

According to the ninth aspect, since the flow path selector is made up of the three-way solenoid valve which is provided at the branch portion where the bypass flow path branches off from the flow path of upstream side of the plurality of battery module cooling units, it is possible not only to control appropriately the temperature of the high-voltage batteries but also to make the selection between the state where the refrigerant is supplied full to the plurality of battery module cooling units and the high-voltage system equipment cooling unit (the DC-DC converter cooling unit and the charger cooling unit) and the state where the refrigerant is supplied full to only the high-voltage system equipment cooling unit based on the flow path selection control in response to the requirement from the high-voltage batteries.

MODE FOR CARRYING OUT THE INVENTION

Figure 1:
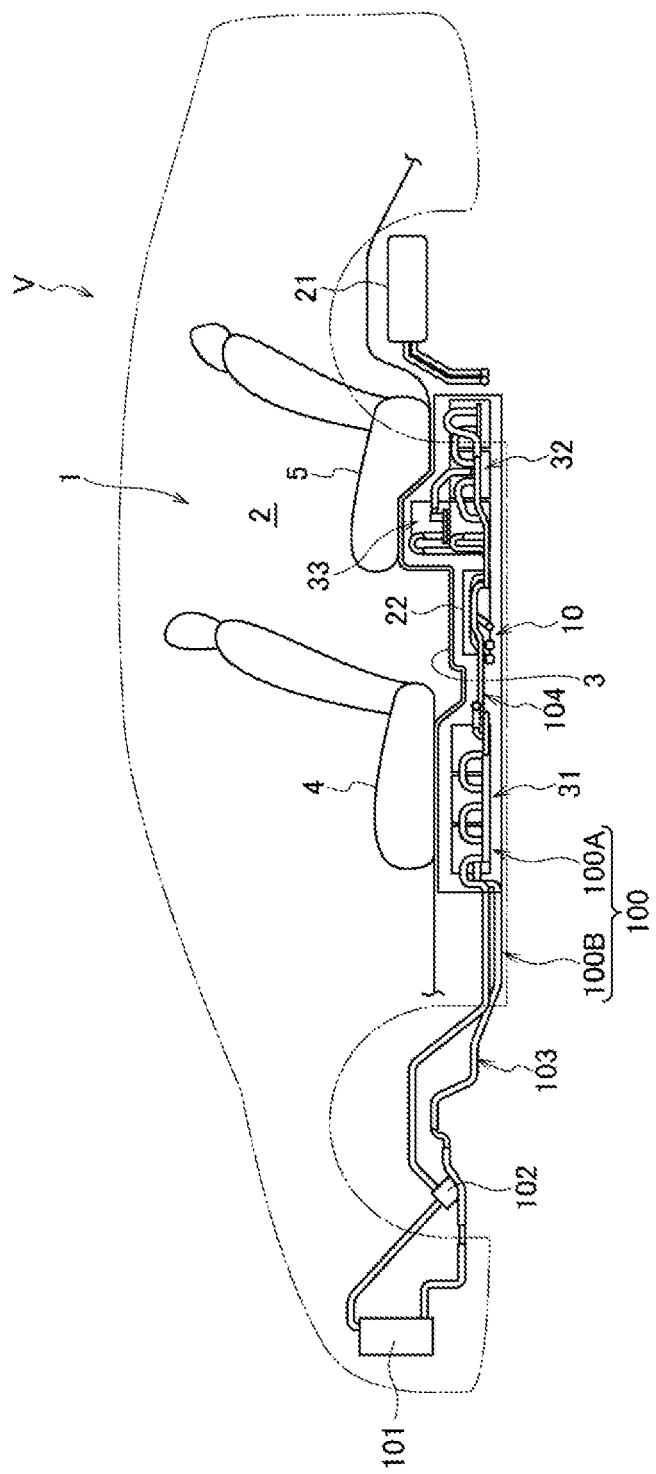
FIG. 1 is a schematic side view of a vehicle on which a vehicle power source system according to an embodiment of the invention is mounted.

Hereinafter, an embodiment of a vehicle power supply system of the invention will be described based on the accompanying drawings. The drawings should be seen in a direction in which given reference numerals look normal.

[Vehicle Power Source System]

As shown in FIG. 1, a vehicle power source system 1 according to an embodiment of the invention includes mainly a plurality of battery modules 31 to 33, a DC-DC converter 22, a charger 21, and a cooling circuit 100 for cooling these constituent parts and is mounted on a vehicle V such as a hybrid electric vehicle, an electric vehicle and a fuel cell vehicle. The plurality of battery modules 31 to 33, the DC-DC converter 22, and part of the cooling circuit 100 are unitized to make up a battery unit 10, which is disposed below a floor panel 3 which makes up a floor surface of a passenger compartment 2. A radiator 101 and a cooling pump 102, which make up the cooling circuit 100, are disposed at a front portion of the vehicle V. The charger 21, which charges the battery modules 31 to 33 using electric power supplied from an exterior power source, is disposed at a rear portion of the vehicle V. The battery unit 10 is held therebetween. The cooling circuit 100 has an interior cooling circuit 100A which is disposed inside the battery unit 10 and an exterior cooling circuit 100E which is disposed outside the battery unit 10.

[Battery Unit]

Figure 2:
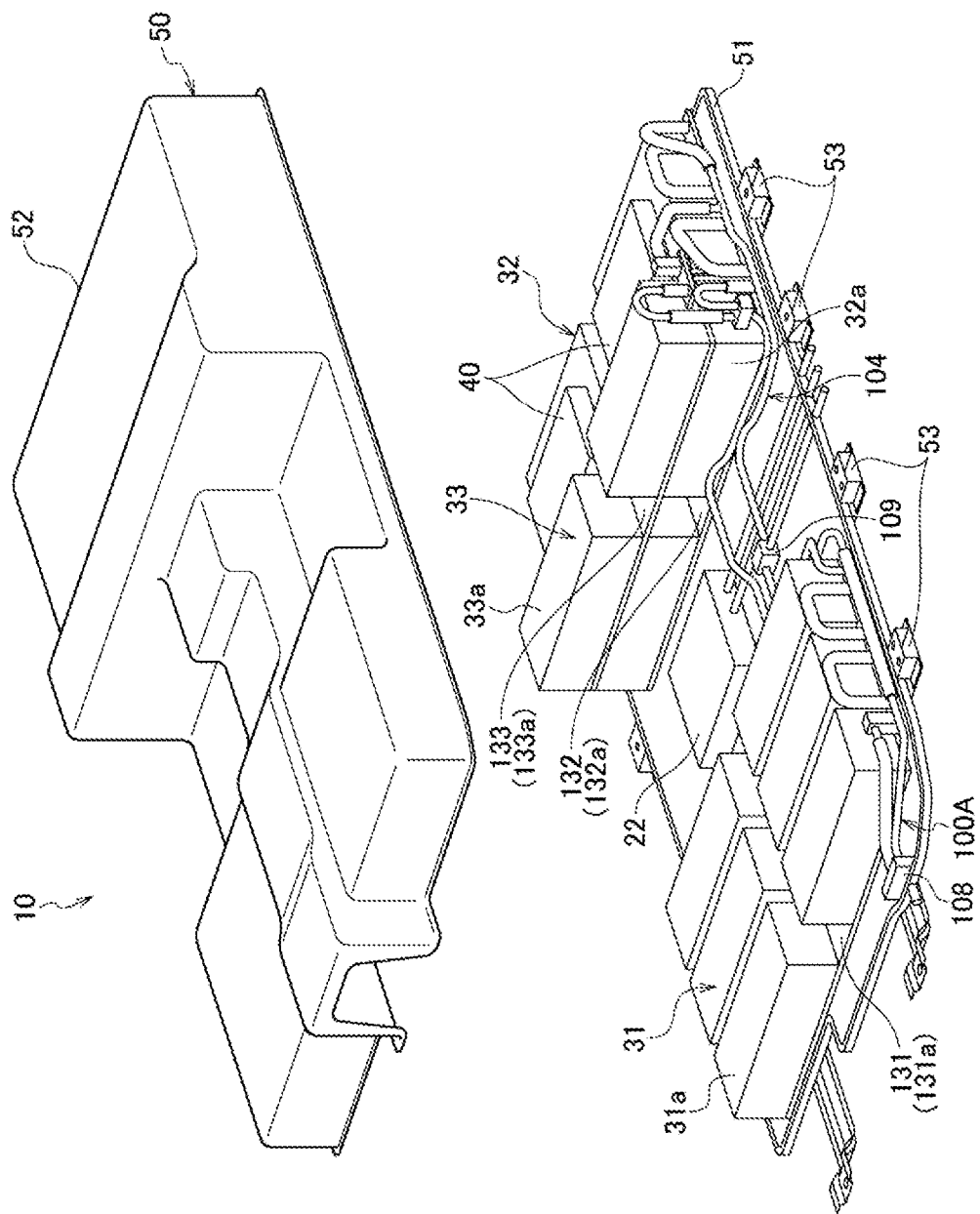
FIG. 2 is an exploded perspective view showing battery units of the vehicle power source system according to the embodiment of the invention.
Figure 3:
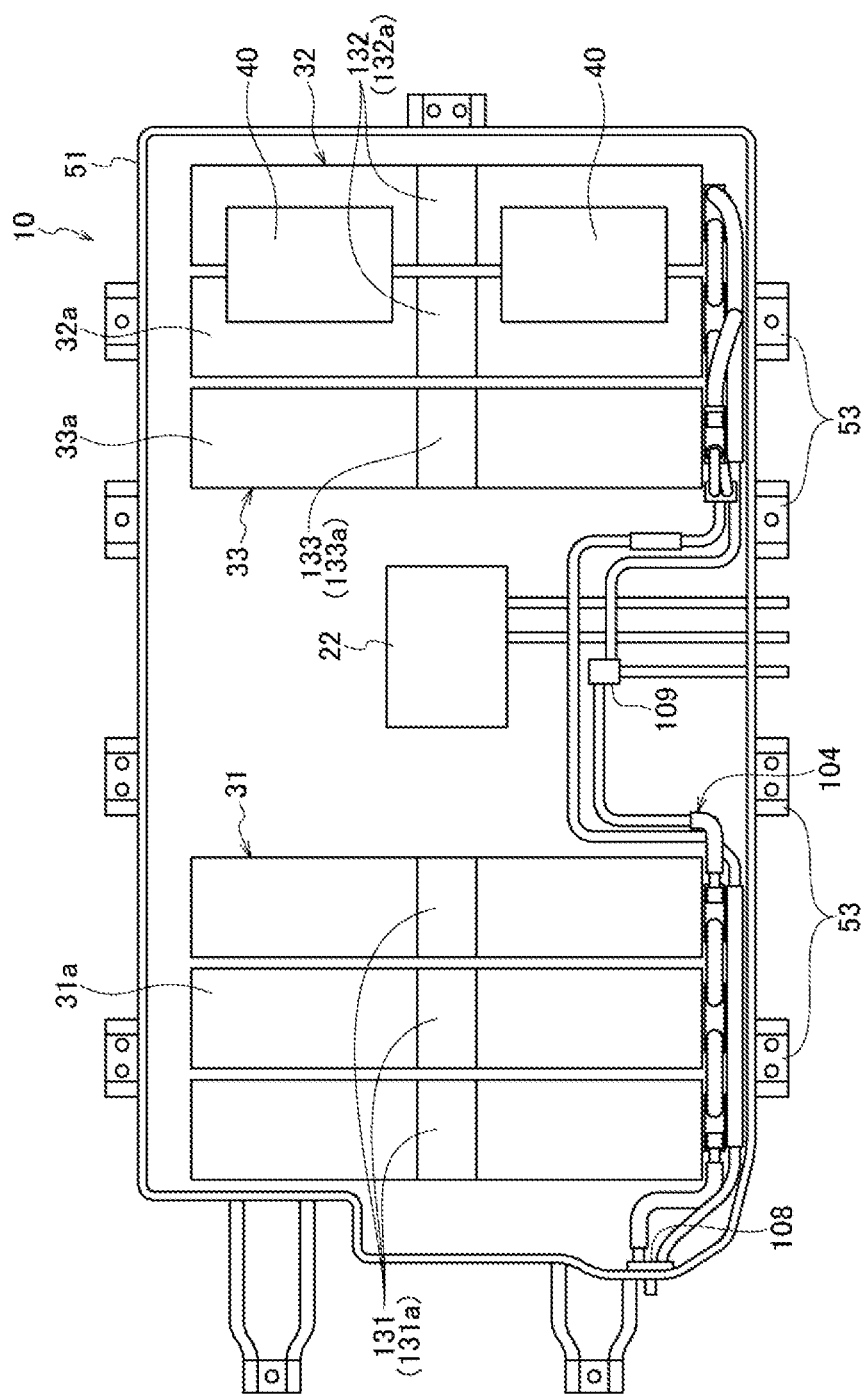
FIG. 3 is an interior plan view showing the battery units of the vehicle power source system according to the embodiment of the invention.

As shown in FIGS. 2 and 3, the battery unit 10 includes the plurality of battery modules 31 to 33, the DC-DC converter 22, battery ECUs 40, the interior cooling circuit 100A and a case 50 which accommodates these constituent parts.

The case 50 is made up of a bottom plate 51 on which the plurality of battery modules 31 to 33, the DC-DC converter 22, the battery ECUs 40, and the interior cooling circuit 100A are mounted, and a cover 52 which covers those constituent parts from above. A plurality of brackets 53 which run transversely underneath the bottom plate 51 are fastened to floor frames (not shown) which are provided transversely inwards of side sills which are provided on both sides of the vehicle V so as to be parallel to the corresponding side sills, whereby the battery unit 10 is attached to the vehicle V in such a way as to be suspended below the floor panel 3.

The plurality of battery modules 31 to 33 include a front battery module 31 which is accommodated in a front portion of the case 50 and two rear battery modules 32, 33 which are accommodated in a rear portion of the case 50, and the battery modules 31 to 33 each have a plurality of high-voltage batteries 31a to 33a. In this embodiment, the front battery module 31 is made up of a total of six high-voltage batteries 31a which are arranged two in a left-right direction and three in a front-rear direction. One rear battery module 32 (hereinafter, also, referred to as a lower rear battery module 32") is made up of a total of six high-voltage batteries 32a which are similarly arranged two in the left-right direction and three in the front-rear direction. The other rear battery module 33 (hereinafter, also, referred to as an "upper rear battery module 33") is made up of two high-voltage batteries 33a which are arranged in the left-right direction.

The plurality of battery modules 31 to 33 are disposed below front seats 4 and a rear seat 5 of the vehicle V. Specifically, the front battery module 31 is disposed below the front seats 4, and the lower rear battery module 32 and the upper rear battery module 33 are disposed below the rear seat 5.

In disposing the front battery module 31 below the front seats 4, the high-voltage batteries 31a are laid out flat without being superposed. In disposing the lower rear battery module 32 and the upper rear battery module 33 below the rear seat 5, the lower rear battery module 32 and the upper rear battery module 33 are superposed vertically under a front portion of a seat cushion of the rear seat 5. Specifically, the two high-voltage batteries 33a which make up the upper rear battery module 33 are disposed above the two high-voltage batteries 32a which are arranged frontmost in the six high-voltage batteries 32a which make up the lower rear battery module 32.

The DC-DC converter 22 is the high-voltage system equipment which converts a direct current and is disposed between the front battery module 31 and the rear battery modules 32, 33 and at a transverse center of the battery unit 10. The battery ECUs 40 are battery controllers which control the charging and discharging of the high-voltage batteries 31a to 33a, as well as temperatures thereof and are disposed behind the upper rear battery module 33 and above the lower rear battery module 32.

The DC-DC converter 22 and the charger 21 are more heat-resistant than the high-voltage batteries 31a to 33a, and their control temperatures are set higher than those of the high-voltage batteries 31a to 33a. For example, assuming that the upper limit temperature of the high-voltage batteries 31a to 33a is 60° C., the upper limit temperatures of the DC-DC converter 22 and the charger 21 are set at 80° C., and hence, under a high-temperature environment, the high-voltage batteries 31a to 33a need to be cooled in preference to the DC-DC converter 22 and the charger 21. On the other hand, in charging, since the charger 21 is heated to high temperatures, there may be a situation in which although the high-voltage batteries 31a to 33a do not have to be cooled, only the DC-DC converter 22 and the charger 21 need to be cooled.

The interior cooling circuit 100A will be described below together with the exterior cooling circuit 100B.

[Operation of Cooling Circuit]

Figure 4:
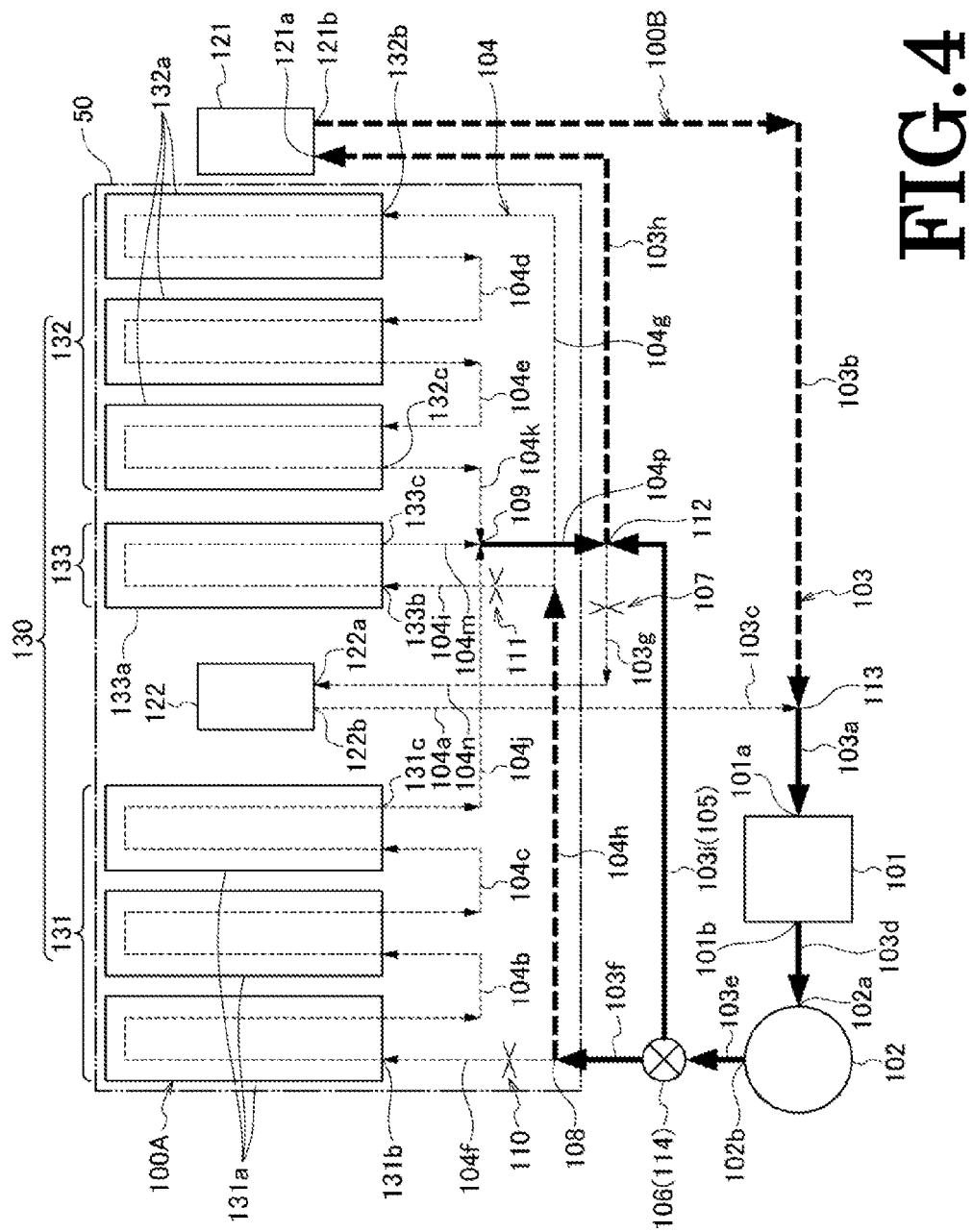
FIG. 4 is a circuit diagram showing the configuration of a cooling circuit of the vehicle power source system according to the embodiment of the invention.

As shown in FIG. 4, in the cooling circuit 100, the radiator 101, the cooling pump 102, a high-voltage battery cooling unit 130, a DC-DC converter cooling unit 122, and a charger cooling unit 121 are connected together by an external piping 103 which is laid out outside the battery unit 10 and an internal piping 104 which is laid out inside the battery unit 10 to thereby form a refrigerant circulation path.

The radiator 101 radiates heat of a refrigerant which flows in from an inlet port 101a and discharges the refrigerant which is cooled as a result of the heat being radiated therefrom from an outlet port 101b. The inlet port 101a of the radiator 101 is connected to an outlet port 121b of the charger cooling unit 121 by way of a first external piping 103a and a second external piping 103b and is connected to an outlet port 122b of the DC-DC converter cooling unit 122 by way of the first external piping 103a, a third external piping 103c and a first internal piping 104a. The outlet port 101b of the radiator 101 is connected to a suction port 102a of the cooling pump 102 by way of a fourth external piping 103d.

The cooling pump 102 discharges the refrigerant sucked in from the suction port 102a from a discharge port 102b in response to a driving of an electric motor (not shown). The discharge port 102b of the cooling pump 102 is connected to a branch portion 108 which is an inlet port of the high-voltage battery cooling unit 130 by way of a fifth external piping 103e and a sixth external piping 103f.

The high-voltage battery cooling unit 130 has a plurality of battery module cooling units 131 to 133 for cooling the plurality of battery modules 31 to 33. A front battery module cooling unit 131 for cooling the front battery module 31 has three cooling jackets 131a which are arranged in the front-rear direction for cooling the three pairs of transversely arranged high-voltage batteries 31a, and these cooling jackets 131a are connected in series by way of a second internal piping 104b and a third internal piping 104c. A lower rear battery module cooling unit 132 for cooling the lower rear battery module 32 has three cooling jackets 132a which are arranged in the front-rear direction for cooling the three pairs of transversely arranged two high-voltage batteries 32a, and these cooling jackets 132a are connected in series by way of a fourth internal piping 104d and a fifth internal piping 104e. An upper rear battery module cooling unit 133 for cooling the upper rear battery module 33 has a single cooling jacket 133a for cooling the pair of transversely arranged two high-voltage batteries 33a.

In the high-voltage battery cooling unit 130, the plurality of battery module cooling units 131 to 133 are arranged in parallel. Specifically, an outlet port 131b of the front battery module cooling unit 131 is connected to the branch portion 108 by way of a six internal piping 104f, an inlet port 132b of the lower rear battery module cooling unit 132 is connected to the branch portion 108 by way of a seventh internal piping 104g and an eighth internal piping 104h, and an inlet port 133b of the upper rear battery module cooling unit 133 is connected to the branch portion 108 by way of a ninth internal piping 104i and the eighth internal piping 104h. An outlet port 131c of the front battery module cooling unit 131 is connected to a merging portion 109 by way of a tenth internal piping 104j, an outlet port 132c of the lower rear battery module cooling unit 132 is connected to the merging portion 109 by way of an eleventh internal piping 104k, and an outlet port 133c of the upper rear battery module cooling unit 133 is connected to the merging portion 109 by way of a twelfth internal piping 104m.

Then, in the battery unit 10, in arranging the plurality of battery module cooling units 131 to 133 in parallel, the branch portion 108 which is provided at the upstream side of the plurality of battery module cooling units 131 to 133 and the merging portion 109 which is provided at the downstream side of the plurality of battery module cooling units 131 to 133 are both provided inside the case 50.

In the high-voltage battery cooling unit 130, in arranging the plurality of battery module cooling units 131 to 133 in parallel, orifices 110, 111, which function as flow rate control devices, are provided at the upstream side (or downstream side) of the battery module cooling units 131 to 133 for cooling the battery modules 31 to 33 having a small battery capacity in the plurality of battery modules 31 to 33 and at the downstream side of the branch portion 108.

For example, since the front battery module 31 has a battery capacity which is smaller than a total battery capacity of the two lower rear battery module 32 and upper rear battery module 33, the orifice 110 as the flow rate control device is provided at the upstream side of the front battery module cooling unit 131 (along the sixth internal piping 104f) for cooling the front battery module 31. In addition, since the upper rear battery module 33 has a battery capacity which is smaller than a battery capacity of the lower rear battery module 32, the orifice 111 as the flow rate control device is provided at the upstream side of the upper rear battery module cooling unit 133 for cooling the upper rear battery module 33 (along the ninth inner piping 104i).

The DC-DC converter cooling unit 122 is a cooling jacket which is incorporated in the DC-DC converter 22 or a cooling jacket which is disposed adjacent to the DC-DC converter 22, and the charger cooling unit 121 is a cooling jacket incorporated in the charger 21 or a cooling jacket which is disposed adjacent to the charger 21. Then, the DC-DC converter cooling unit 122 and the charger cooling unit 121 are connected in parallel to each other and are disposed on the downstream side of the high-voltage battery cooling unit 130.

Specifically, an inlet port 122a of the DC-DC converter cooling unit 122 is connected to a branch portion 112 by way of a thirteenth inner piping 104n and a seventh external piping 103g, and an inlet port 121a of the charger cooling unit 121 is connected to the branch portion 112 by way of an eighth external piping 103h. In addition, an outlet port 122b of the DC-DC converter cooling unit 122 is connected to a merger portion 113 by way of the first inner piping 104a and the third external piping 103c, and an outlet port 121b of the charger cooling unit 121 is connected to the merging portion 113 by way of the second external piping 103b. Then, the branch portion 112 is connected to the merging portion 109 of the high-voltage battery cooling unit 130 by way of a fourteenth internal piping 104p, and the merging portion 113 is connected to the inlet port 101a of the radiator 101 by way of the first external piping 103a.

In the cooling circuit 100, in connecting the DC-DC converter cooling unit 122 and the charger cooling unit 121 in parallel, an orifice 107, which functions as a flow rate control device, is provided at the upstream side (or downstream side) of the DC-DC converter cooling unit 122 which has a smaller flow rate requirement than that of the charger cooling unit 121. Specifically, the orifice 107 is provided at the seventh external piping 103g to limit the flow rate of the refrigerant which flows into the DC-DC converter cooling unit 122, so that the remaining flow rate of the refrigerant is supplied to the charger cooling unit 121. In general, a charger has a greater heat value than that of a DC-DC converter, and therefor, the flow rate of the refrigerant for cooling the charger 21 is set greater than the flow rate of the refrigerant for cooling the DC-DC converter 22, so as to cool the charger 21 positively.

Further, in the cooling circuit 100, a bypass flow path 105 is provided which connects an upstream side of the high-voltage battery cooling unit 130 to a portion that is positioned on the upstream side of the high-voltage system equipment cooling unit 120 (the DC-DC converter cooling unit 122 and the charger cooling unit 121) and that is positioned on the downstream side of the high-voltage battery cooling unit 130. Specifically, a connecting portion between the fifth external piping 103e and the sixth external piping 103f is referred to as a branch portion 114, and the branch portion 114 is connected to the branch portion 112 of the high-voltage system equipment cooling unit 120 by way of a ninth external piping 103i which makes up the bypass flow path 105. Then, a three-way solenoid valve 106, which function as a flow path selector, is provided at the branch portion 114.

When the three-way solenoid valve 106 is off, the fifth external piping 103e and the sixth external piping 103f are connected, whereby the refrigerant discharged from the cooling pump 102 is supplied to the high-voltage battery cooling unit 130, while the fifth external piping 103e is disconnected from the bypass flow path 105 (the ninth external piping 103i), whereby the direct supply of the refrigerant to the DC-DC converter cooling unit 122 and the charger cooling unit 121 is cut off. On the other hand, when the three-way solenoid valve 106 is on, the fifth external piping 103e and the bypass flow path 105 (the ninth external piping 103i) are connected, whereby the refrigerant discharged from the cooling pipe 102 is supplied to the DC-DC converter cooling unit 122 and the charger cooling unit 121, while the fifth external piping 103e is disconnected from the sixth external piping 103f, whereby the supply of the refrigerant to the high-voltage battery cooling unit 130 is cut off. In FIG. 4, arrows denote flows of the refrigerant, and there is no such situation that both the sixth external piping 103f and the bypass flow path 105 (the ninth external piping 103i) are connected to the fifth external piping 103e.

Figure 5:
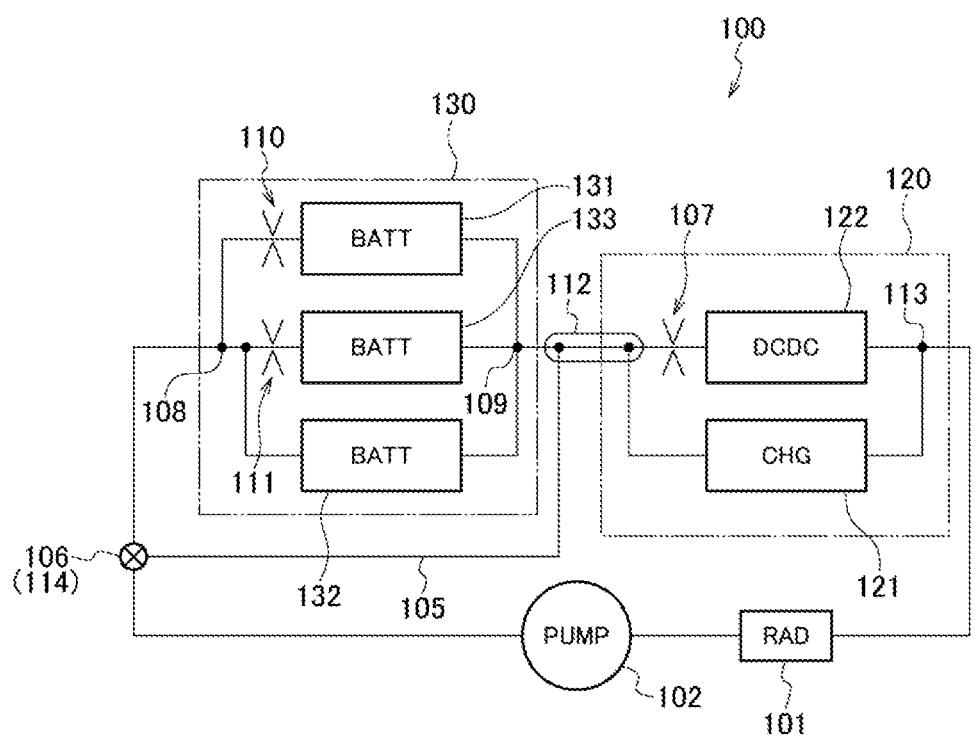
FIG. 5 is a schematic block diagram of the cooling circuit of the vehicle power source system according to the embodiment of the invention.

FIG. 5 is a schematic block diagram of the cooling circuit 100 which has been described in detail by using FIG. 4. In the figure, a reference character CHG denotes the charger cooling unit 121, a reference character DCDC denotes the DC-DC converter cooling unit 122, and reference characters BATT denote the battery module cooling units 131 to 133 (this will be true with FIGS. 6 to 9, which will be described below).

As shown in FIG. 5, in the cooling circuit 100 of this embodiment, the radiator 101, the cooling pump 102, the high-voltage converter cooling unit 130, and the high-voltage system equipment cooling unit 120 made up of the charger cooling unit 121 and the DC-DC cooling unit 122 are connected in series, and the high-voltage system equipment cooling unit 120 is disposed on the downstream side of the high-voltage battery cooling unit 130. Additionally, the upstream side of the high-voltage battery cooling unit 130, the upstream side of the high-voltage system equipment cooling unit 120 and the downstream side of the high-voltage battery cooling unit 130 are connected by the bypass flow path 105, and the three-way solenoid valve 106 is provided at the branch portion 114 where the bypass flow path 105 branches off from an upstream-side flow path of the high-voltage battery cooling unit 130. Further, the high-voltage battery cooling unit 130 is made up of the three battery module cooling units 131 to 133 which are disposed in parallel, and the high-voltage system equipment cooling unit 120 is made up of the DC-DC converter cooling unit 122 and the charger cooling unit 121 which are disposed in parallel.

[Operation of Cooling Circuit]

Figure 6:
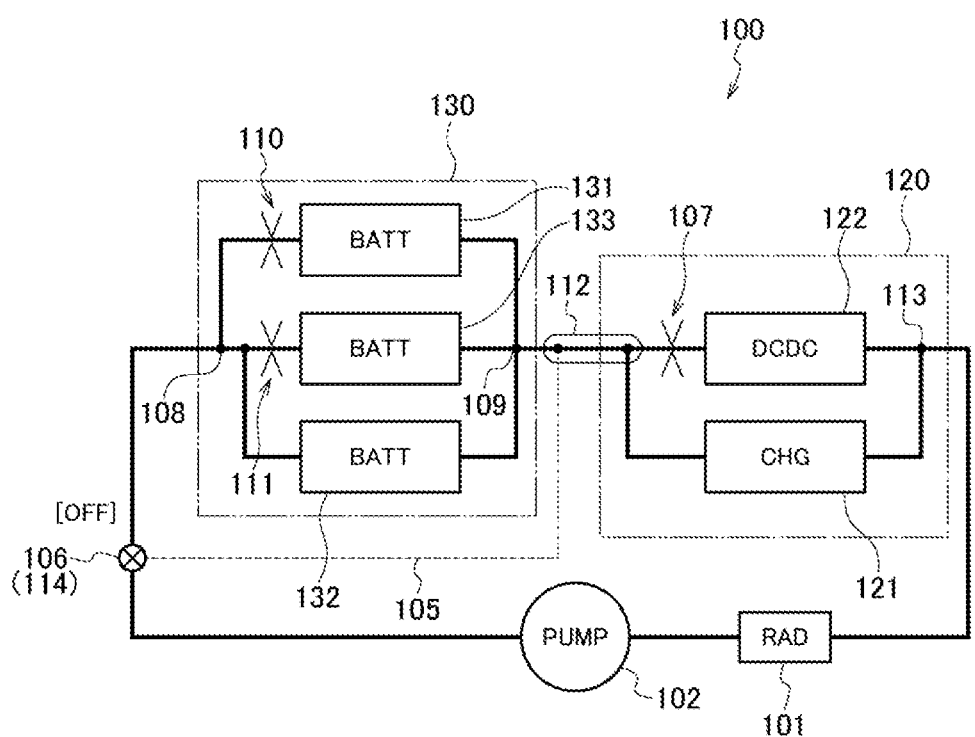
FIG. 6 is a schematic block diagram showing a flow of a refrigerant when a three-way solenoid valve is off in the cooling circuit shown in FIG. 5.
Figure 7:
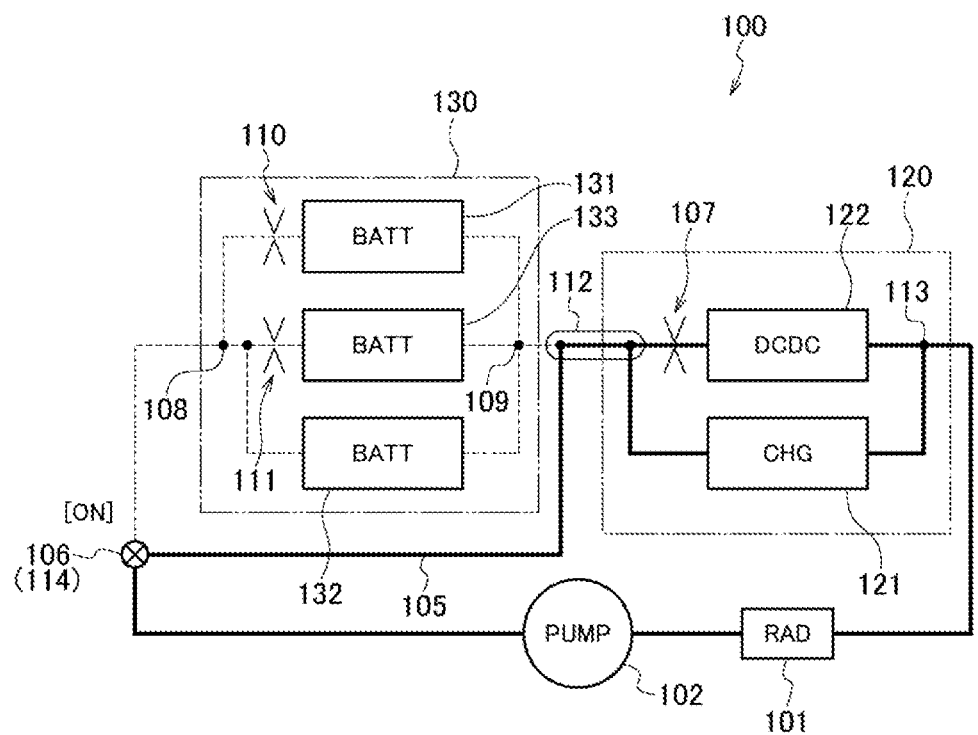
FIG. 7 is a schematic block diagram showing a flow of the refrigerant when the three-way solenoid valve is on in the cooling circuit shown in FIG. 5.

Next, the operation of the cooling circuit 100 will be described by reference to FIGS. 6 and 7. In FIGS. 6 and 7, the flow paths through which the refrigerant flows are indicated by solid lines, whereas the flow paths through which no refrigerant flows are indicated by broken lines.

<Three-Way Solenoid Valve [OFF]>

In the cooling circuit 100 configured in the way described above, when the cooling pump 102 is driven, the cooling pump 102 sucks in the refrigerant whose temperature is low from the radiator 101 side and discharges the refrigerant so sucked towards the high-voltage battery cooling unit 130. In a normal state, since the three-way solenoid valve 106 is off, as shown in FIG. 6, the refrigerant discharged from the cooling pump 102 does not flow to the bypass flow path 105 but is supplied full to the high-voltage battery cooling unit 130.

The refrigerant which is supplied to the high-voltage battery cooling unit 130 is at first distributed to the front battery module cooling unit 131 and the rear battery module cooling units 132, 133 at the branch portion 108. As this occurs, the flow rate of the refrigerant towards the front battery module cooling unit 131 is restricted at the orifice 110, whereby a greater amount of refrigerant than the amount of refrigerant supplied to the front battery module cooling unit 131 is supplied to the rear battery module cooling units 132, 133. The refrigerant supplied to the rear battery module cooling units 132, 133 are distributed further to the lower rear battery module cooling unit 132 and the upper rear battery module cooling unit 133. In this situation, the flow rate of the refrigerant towards the upper rear battery module cooling unit 133 side is restricted at the orifice 111, whereby a greater amount of refrigerant than an amount of refrigerant which is to be distributed to the upper rear battery module cooling unit 133 is supplied to the lower rear battery module cooling unit 132.

The flows of refrigerant which pass through the three battery module cooling units 131 to 133 merge together at the merging portion 109, whereafter the refrigerant is distributed to the DC-DC converter cooling unit 122 and the charger cooling unit 121 by way of the branch portion 112. In this situation, the flow rate of the refrigerant distributed to the DC-DC converter cooling unit 122 side is restricted by the orifice 107, whereby a greater amount of refrigerant than the amount of the refrigerant distributed to the DC-DC converter cooling unit 122 is supplied to the charger cooling unit 121. Then, the flows of refrigerant which pass through the DC-DC converter cooling unit 122 and the charger cooling unit 121 merge together at the merging portion 113, whereafter the refrigerant returns to the radiator 101 where the refrigerant is cooled.

<Three-Way Solenoid Valve [ON]>

In the cooling circuit 100, in the event that the high-voltage batteries 31a to 33a do not have to be cooled, or in the event that the DC-DC converter 22 and the charger 21 need to be cooled although the temperature of the refrigerant is not suited to the temperature requirement of the high-voltage batteries 31a to 33a, the three-way solenoid valve 106 is controlled to be on, whereby as shown in FIG. 7, the supply of the refrigerant to the high-voltage battery cooling unit 130 is cut off, so that only the DC-DC converter 22 and the charger 21 can be cooled. Namely, when the three-way solenoid valve 106 is on, the refrigerant discharged form the cooling pump 102 does not flow to the high-voltage battery cooling unit 130 but is supplied full to the bypass flow path 105. The refrigerant supplied to the bypass flow path 105 bypasses the high-voltage battery cooling unit 130 to be distributed to the DC-DC converter cooling unit 122 and the charger cooling unit 121 by way of the branch portion 112. In this situation, the flow rate of the refrigerant distributed to the DC-DC converter cooling unit 122 side is restricted by the orifice 107, whereby a greater amount of refrigerant than the amount of the refrigerant distributed to the DC-DC converter cooling unit 122 is supplied to the charger cooling unit 121. Then, the flows of refrigerant which pass through the DC-DC converter cooling unit 122 and the charger cooling unit 121 merge together at the merging portion 113, whereafter the refrigerant returns to the radiator 101 where the refrigerant is cooled.

Thus, as has been described heretofore, according to the vehicle power supply system 1 of this embodiment, in the cooling circuit 100, the plurality of battery module cooling units 131 to 133 which are accommodated in the case 50 are disposed in parallel, and the branch portion 108 which is provided to an upstream side of the plurality of battery module cooling units 131 to 133 and the merging portion 109 which is provided to a downstream side of the plurality of battery module cooling units 131 to 133 are provided in the case 50, and therefore, the pipings which connect the plurality of battery module cooling units 131 to 133 together can be accommodated in the case 50, as a result of which a piping process becomes unnecessary in which the battery module cooling units 131 to 133 are connected together after the case 50 has been attached to the vehicle V, thereby making it possible to simplify the fabrication process of the vehicle V.

In addition, the front battery module 31 has the battery capacity which is smaller than the total of the battery capacities of the two lower rear battery module 32 and lower upper battery module 33, and therefore, the orifice 110 is provided on the upstream side of the front battery module cooling unit 131. The upper rear battery module 33 has the battery capacity which is smaller than that of the lower rear battery module 32, and therefore, the orifice 111 is provided on the upstream side of the upper rear battery module cooling unit 133. By doing so, even when cooling the plurality of battery modules 31 to 33 having the different battery capacities, the flow rates of refrigerant which match the battery capacities of the plurality of battery module cooling units 131 to 133 can be supplied to the corresponding battery module cooling units to thereby cool the plurality of battery modules 31 to 33 uniformly.

Additionally, since the plurality of battery modules 31 to 33 are disposed under the front seats 4 and the rear seat 5, so many battery modules 31 to 33 can be mounted on the vehicle by making use of the spaces defined under the front seats 4 and the rear seat 5 of the vehicle V while suppressing the influence on the passenger compartment 2. In particular, since the front battery module 31 is laid out flat under the front seats 4, the influence on the occupant and the driver who are seated on the front seats 4 can be suppressed. Since the lower rear battery module 32 and the upper rear battery module 33 are disposed vertically one on the other under the front of the seat cushion of the rear seat 5, the lower rear battery module 32 and the upper rear battery module 33 are installed vertically in the two stages by making use of the space under the rear seat 5 whose seat cushion is inclined obliquely downwards from the front to the rear, thereby making it possible to suppress the influence on the occupants who are seated on the rear seat 5.

In the cooling circuit 100, since the DC-DC converter cooling unit 122 and the charger cooling unit 121 are disposed in parallel at the downstream side of the plurality of battery module cooling units 131 to 133, the plurality of battery modules 31 to 33, the DC-DC converter 22 and the charger 21 can be cooled by the single cooling circuit.

In addition, since the DC-DC converter cooling unit 122 and the charger cooling unit 121 are disposed in parallel, the pressure loss can be reduced when compared with a case where the DC-DC converter cooling unit 122 and the charger cooling unit 121 are disposed in series. Additionally, even though the refrigerant flow rate requirements of the DC-DC converter cooling unit 122 and the charger cooling unit 121 are different, the refrigerant matching the respective refrigerant flow rate requirements can be supplied to the DC-DC converter cooling unit 122 and the charger cooling unit 121 without any waste, and therefore, the delivery capacity of the cooling pump 102 can be suppressed.

Since the cooling circuit 100 has the bypass flow path 105 which bypasses the high-voltage battery cooling unit 130 and the three-way solenoid valve 106 which is the solenoid valve as the flow path selector which determines on the selection of the bypass flow path 105, not only can the supply of refrigerant to the high-voltage battery cooling unit 130 be cut off selectively by the simple circuit configuration, but also the temperatures of the high-voltage batteries 31a to 33a can be controlled appropriately based on the flow path selection control in response to the requirement of the high-voltage batteries 31a to 33a.

The three-way solenoid valve 106 is provided at the branch portion 114 where the bypass flow path 105 branches off from the flow path of the upstream side of the high-voltage battery cooling unit 130, and therefore, it is possible to make the selection between the state where the refrigerant is supplied full to the high-voltage battery cooling unit 130 and the high-voltage system equipment cooling unit 120 and the state where the refrigerant is supplied full to only the high-voltage system equipment cooling unit 120 based on the selecting control of the three-way solenoid valve 106.

The invention is not limited to the embodiment which has been described heretofore and hence can be modified or improved as required.

For example, in the embodiment described above, the high-voltage battery cooling unit 130 is described as being made up of the three battery module cooling units 131 to 133 so as to correspond individually to the three battery modules 31 to 33. However, the invention is not limited thereto, and hence, two or more battery module cooling units may be provided.

In the cooling circuit 100 of the embodiment, while the DC-DC converter cooling unit 122 and the charger cooling unit 121, which constitute the high-voltage system equipment cooling unit 120, are described as being connected in parallel, the invention is not limited thereto. Thus, the DC-DC converter cooing unit 122 and the charger cooling unit 121 may be connected in series.

The high-voltage system equipment cooling unit 120 is not always required. Further, the high-voltage system equipment cooling unit 120 may be made up of a cooling circuit which is separate from that for the high-voltage battery cooling unit 130.

In the embodiment, while the DC-DC converter 22 and the charger 21 are described as making up the high-voltage system equipment, the high-voltage system equipment may be made up of either of them. However, the invention is not limited thereto, and hence, the high-voltage system equipment may be made up of other high-voltage system equipment such as an inverter.

The cooling circuit 100 described above may be a water-cooled cooling circuit which utilizes water as a refrigerant or an oil-cooled cooling circuit which utilizes oil as a refrigerant.

This patent application is based on Japanese Patent Application (No 2014-245941) filed on Dec. 4, 2014, the contents of which are incorporated herein by reference.

DESCRIPTION OF REFERENCE NUMERALS

1 Vehicle power supply system
3 Floor panel
4 Front seat
5 Rear seat
21 Charger (high-voltage system equipment)
22 DC-DC converter (high-voltage system equipment)
31a to 33a High-voltage battery
31 Front battery module
32 Lower rear battery module
33 Upper rear battery module
50 Case
100 Cooling circuit
101 Radiator
102 Cooling pump
103f Sixth external piping (upstream-side flow path of battery cooling unit)
105 Bypass flow path
106 Three-way solenoid valve (flow path selector)
108 Branching portion
109 Merging portion
110 Orifice (flow rate control device)
111 Orifice (flow rate control device)

121 Charger cooling unit
122 DC-DC converter cooling unit
131 Front battery module cooling unit
132 Lower front battery module cooling unit
133 Upper front battery module cooling unit

The invention claimed is:

1. A vehicle power supply system comprising:
   a plurality of battery modules each having a plurality of high-voltage batteries;
   a case for accommodating the plurality of battery modules; and
   a cooling circuit having a radiator, a cooling pump, a plurality of battery cooling units for cooling the plurality of battery modules,
   the case being disposed below a floor panel, wherein:
   the plurality of battery modules include a front battery module which is disposed under a front seat, and at least two rear battery modules which are disposed under a rear seat;
   the front battery module is laid out flat under the front seat;
   the at least two rear battery modules include an upper rear battery module and a lower rear battery module, which are superposed vertically under a front of a seat cushion of a rear seat;
   the front battery module has a battery capacity which is smaller than a total of battery capacities of the at least two rear battery modules;
   the upper rear battery module has a battery capacity which is smaller than that of the lower rear battery module;
   in the cooling circuit,
   the plurality of battery module cooling units are connected in parallel by piping;
   the radiator and the cooling pump are disposed outside the case;
   the plurality of battery module cooling units, the piping, a branch portion which is provided to an upstream side of the plurality of battery module cooling units, and a merging portion which is provided to a downstream side of the plurality of battery module cooling units are provided inside the case; and
   a first flow rate control device is disposed at an upstream side or a downstream side of a front battery module cooling unit for cooling the front battery module; and
   a second flow rate control device is disposed at an upstream side or a downstream side of an upper rear battery module cooling unit for cooling the upper rear battery module.

2. The vehicle power supply system according to claim 1, wherein:
   the vehicle power supply system includes further high-voltage system equipment having a DC-DC converter and a charger;
   the cooling circuit has further a DC-DC converter cooling unit for cooling the DC-DC converter, and a charger cooling unit for cooling the charger; and
   in the cooling circuit, the DC-DC converter cooling unit and the charger cooling unit are disposed in parallel at the downstream side of the plurality of battery module cooling units.

3. The vehicle power supply system according to claim 2, wherein
   the cooling circuit has:
   a bypass flow path which connects the upstream side of the plurality of battery module cooling units to a portion that is positioned on an upstream side of the DC-DC converter cooling unit and the charger cooling unit and that is positioned on the downstream side of the plurality of battery module cooling units; and
   a flow path selector which is provided at the upstream side of the plurality of battery module cooling units.

4. The vehicle power supply system according to claim 3, wherein
   the flow path selector is a three-way solenoid valve which is provided at a branch portion where the bypass flow path branches off from a flow path of the upstream side of the plurality of battery module cooling units.

* * * * *